US012710898B1

(12) United States Patent
Guda

(10) Patent No.: US 12,710,898 B1
(45) Date of Patent: Aug. 18, 2026

(54) SCAN AHEAD AND ANALYSIS OF NVMe COMMAND SUBMISSION QUEUES ON HOST SYSTEM FOR SCHEDULING OF INTERNAL MEMORY MANAGEMENT OPERATIONS

(71) Applicant: Micron Technology, Inc., Boise, ID (US)

(72) Inventor: Chandra Guda, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/175,594

(22) Filed: Apr. 10, 2025

(51) Int. Cl.
*G06F 3/06* (2006.01)

(52) U.S. Cl.
CPC ............ *G06F 3/0659* (2013.01); *G06F 3/061* (2013.01); *G06F 3/0688* (2013.01)

(58) Field of Classification Search
CPC ...... G06F 3/0659; G06F 3/061; G06F 3/0688; G06F 2212/7205
See application file for complete search history.

(56) References Cited

U.S. PATENT DOCUMENTS 10,739,996 B1 * 8/2020 Ebsen .................. G06F 3/0608
2009/0132754 A1 * 5/2009 Riska .................. G06F 3/0676
711/111

* cited by examiner

*Primary Examiner* — Chie Yew
(74) *Attorney, Agent, or Firm* — Lowenstein Sandler LLP

(57) ABSTRACT

A processing device in a memory sub-system detects an occurrence of a scan ahead trigger event in a memory sub-system, initiates a scan ahead operation of a plurality of command submission queues in a host system coupled to the memory sub-system to read a plurality of pending command submission queue entries from the plurality of command submission queues, and stores respective indications of the plurality of pending command submission queue entries in a cache memory of the memory sub-system.

20 Claims, 7 Drawing Sheets

ANALYZE INDICATIONS OF PENDING COMMAND SUBMISSION QUEUE ENTRIES
605

DETERMINE A FUTURE PERIOD OF DOWNTIME IN THE MEMORY SUB-SYSTEM
610

SCHEDULE INTERNAL MEMORY MANAGEMENT OPERATIONS DURING THE FUTURE PERIOD OF DOWNTIME
615

SCAN AHEAD AND ANALYSIS OF NVMe COMMAND SUBMISSION QUEUES ON HOST SYSTEM FOR SCHEDULING OF INTERNAL MEMORY MANAGEMENT OPERATIONS

TECHNICAL FIELD

Embodiments of the disclosure relate generally to memory sub-systems, and more specifically, relate to scan ahead and analysis of NVMe command submission queues on a host system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
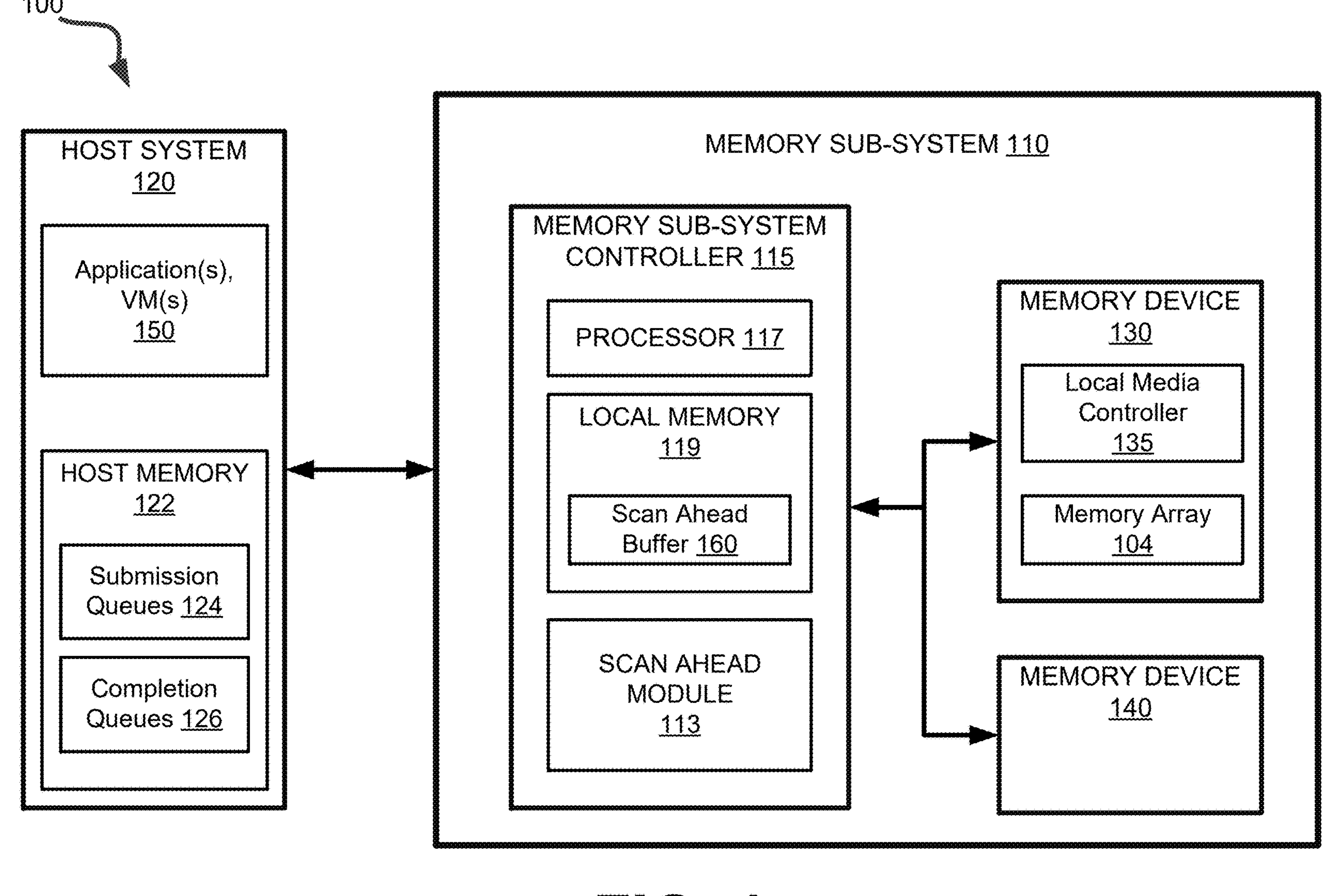
FIG. 1 illustrates an example computing system that includes a memory sub-system in accordance with some embodiments of the present disclosure.

Aspects of the present disclosure are directed to scan ahead and analysis, by a memory sub-system, of NVMe command submission queues on a host system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a NAND memory device, such as 3D flash NAND memory, which offers storage in the form of compact, high density configurations. Other examples of non-volatile memory devices are described below in conjunction with FIG. 1. A non-volatile memory device is a package of one or more dice, each including one or more planes. For some types of non-volatile memory devices (e.g., NAND memory devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types.

One example of a memory sub-system is a solid-state drive (SSD) that includes one or more non-volatile memory devices and a memory sub-system controller to manage the non-volatile memory devices. Memory access commands, such as those sent by the host system, request the memory sub-system to perform memory access operations on the memory devices contained therein. Memory access commands can generally be classified into respective categories, such as read commands, write commands, erase commands, move commands, etc. A memory sub-system controller can receive the memory access commands from the host system connected externally to the memory sub-system, such as via a Non-Volatile Memory Express (NVMe) interface on a Peripheral Component Interconnect Express (PCIe) communication bus. The memory sub-system can execute the memory access commands to perform the memory access operations and can store the results of the memory access commands for retrieval by the host system after the memory sub-system reports completion of the execution of the memory access commands.

In certain implementations, the host system can utilize a set of queues to track the memory access commands issued to the memory sub-system. For example, the host system can include a number of submission queues, storing submission queue entries representing the memory access commands issued to the memory sub-system, and a number of completion queues, storing completion queue entries received from the memory sub-system to indicate that the corresponding memory access commands have been executed. Typically, the host system can maintain these queues in a volatile host memory, such as a dynamic random access memory (DRAM) device. Depending on the host system, and the types of applications being executed therein, the host system may include many processing cores (e.g., central processing units, graphics processing units) which can process many threads/streams in parallel. For example, some host systems could include hundreds of parallel processing threads that execute simultaneously. As a result, each processing thread executed on a different processing core, can issue requests to read data from or write data to the memory sub-system concurrently, and may include a respective queue pair (i.e., a submission queue and a completion queue) for the corresponding commands.

The parallelization supported by the NVMe protocol comes at a cost, however, as commands in multiple host system submission queues are competing for the same resources in the memory sub-system. In general, while the host system applications may place memory access commands in the submission queues at one rate, retrieval and processing of those commands by the memory sub-system may occur at a slower rate. Accordingly, a backlog of commands may build-up in the submission queues, while the commands are retrieved by the memory sub-system one at a time for processing (e.g., in a natural order according to a defined arbitration scheme). While the memory sub-system may be notified when new pending commands are added to the submission queues, in conventional systems, there is no way for processing logic on the memory sub-system to know what the pending commands are. As such, a number of issues can arise that negatively impact performance in the memory sub-system and the quality of service provided to the host system. For example, in a sequential read workload, the submission queues may include a large number of read commands directed to consecutive logical block addresses (LBAs). The data corresponding to these LBAs may be stored in the same or adjacent physical pages on the memory device in the memory sub-system. To repeatedly read the same physical pages may involve increased overhead and latency, and may increase read disturb effects and physical wear of the memory device. In addition, some host commands may require excessive processing time (e.g., due to triggering error recovery operations) that delay processing of subsequent commands in the submission queues. Furthermore, there may be some commands added to the submission queues that are higher priority and should be processed sooner and other commands that the host system decides to abort after they are added to the submission queues. The processing logic in the memory sub-system controller has no way of identifying these commands until they are retrieved in the natural order, which may be after some period of time has passed, depending on the number of commands in the submission queues.

Aspects of the present disclosure address the above and other deficiencies by implementing scan ahead and analysis, by the memory sub-system, of the NVMe command submission queues on the host system. In one embodiment, processing logic on the memory sub-system can periodically perform a scan of the host system submission queues and populate a scan ahead buffer with indications of the pending submission queue entries representing the issued NVMe commands. Without actually processing the commands, the processing logic can utilize a direct memory access (DMA) engine to read the contents of the submission queues, store respective indications of the pending submission queue entries in a cache memory, and then analyze the pending submission queue entries in order to optimize operations in the memory sub-system. For example, the processing logic can determine command metrics based on the pending entries and forecast the memory access workloads in order to process the commands more efficiently in the future. Subsequently, as the commands are retrieved from the submission queues in their natural order (e.g., according to a defined arbitration scheme) the processing of the commands can be optimized based on the analysis of the scan ahead buffer.

Advantages of the approach described herein include, but are not limited to, improved performance of the memory sub-system and in the host system. The ability to scan ahead in the host system submission queues allows the memory sub-system to anticipate what workloads are being sent from the host system and optimize the processing of those memory access commands. This can increase cache hit performance, reduce latency, reduce read disturb effects and excess wear on the memory devices of the memory sub-system, and improve the quality of service provided to the host system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the host system 120 includes one or more applications and/or virtual machines 150. The applications and/or virtual machines 150 may be executed by multiple processing cores (e.g., central processing units, graphics processing units) which can process many threads/streams in parallel. For example, host system 120 could include hundreds of parallel processing threads that can generate respective memory access commands (e.g., read command, write commands) directed to memory sub-system 110 concurrently. In one embodiment, the host system 120 utilizes a set of queues to track the memory access commands issued to the memory sub-system 110. For example, the host system 120 can include a number of submission queues 124, storing submission queue entries representing the memory access commands issued to the memory sub-system 110, and a number of completion queues 126, storing completion queue entries received from the memory sub-system 110 to indicate that the corresponding memory access commands have been executed. In one embodiment, the host system 120 can maintain these queues in a host memory 122, such as a dynamic random access memory (DRAM) device or other memory device. Submission queues 124 and completion queues 126 can include circular buffers with a fixed slot size. In other embodiments, there can be some other number of queues or queue pairs in host memory 122.

In one embodiment, memory sub-system 110 includes scan ahead module 113. In some embodiments, the memory sub-system controller 115 includes at least a portion of the scan ahead module 113. For example, the memory sub-system controller 115 can include a processor 117 (i.e., a processing device) configured to execute instructions stored in local memory 119 for performing the operations described herein. In one embodiment, scan ahead module 113 can implement scan ahead operations and analysis of the NVMe command submission queues 124 on the host system 120. In one embodiment, scan ahead module 113 can periodically perform a scan of the host system submission queues 124 and populate a scan ahead buffer 160 with indications of the pending submission queue entries representing the issued NVMe commands. For example, the scan ahead buffer 160 may be implemented in local memory 119 or in some other memory of the memory sub-system controller 115 (e.g., a static random access memory (SRAM) device). Without actually processing the commands, scan ahead module 113 can utilize a direct memory access (DMA) techniques to read the contents of the submission queues 124 and then analyze the pending submission queue entries in order to optimize operations in the memory sub-system 110. For example, scan ahead module 113 can determine command metrics based on the pending entries and forecast the memory access workloads in order to process the commands more efficiently in the future. Subsequently, as the commands are retrieved from the submission queues 124 in their natural order (e.g., according to a defined arbitration scheme) the processing of the commands can be optimized based on the analysis of the scan ahead buffer 160. Further details with regard to the operations of scan ahead module 113 are described below.

Figure 2:
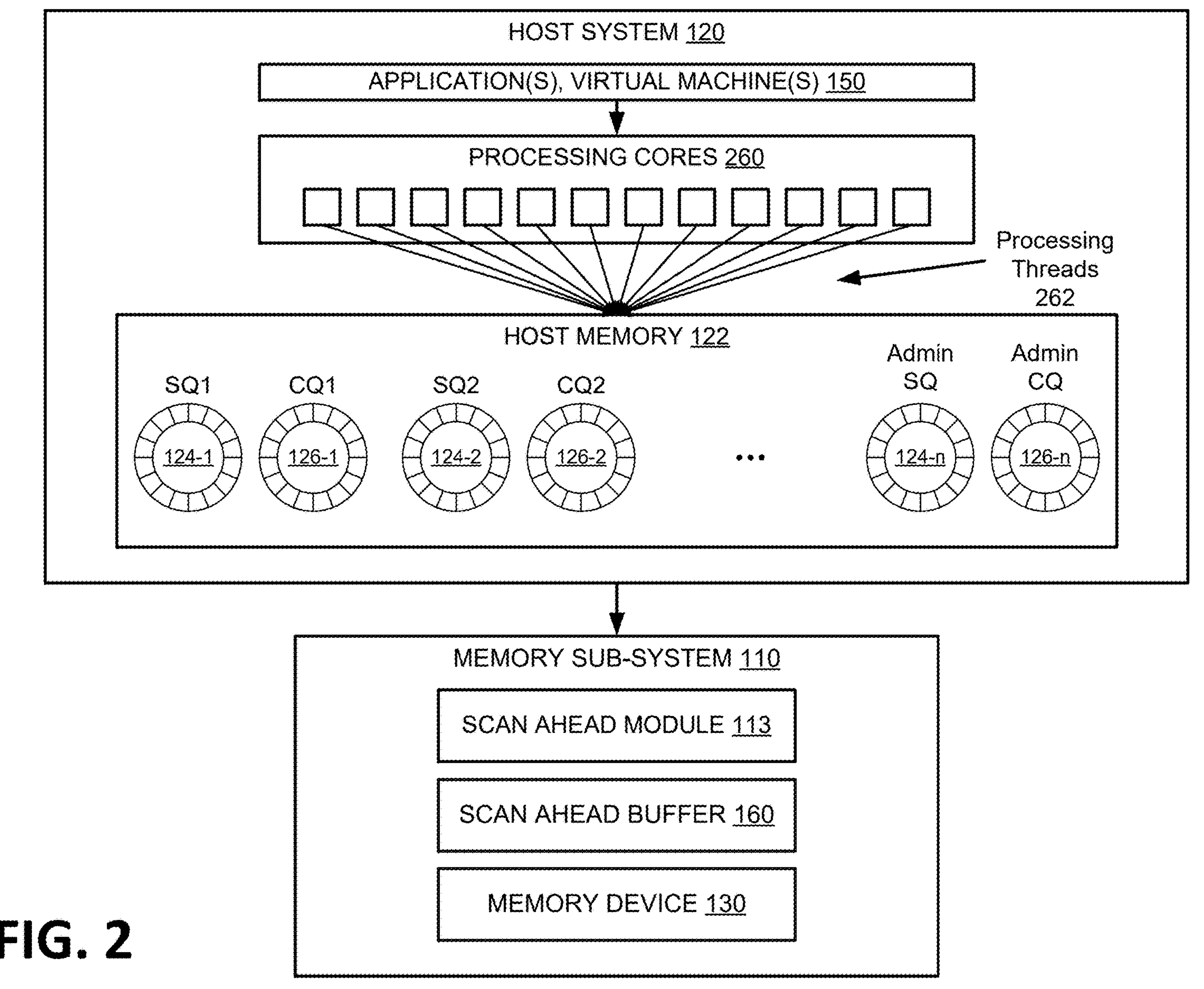
FIG. 2 is a block diagram illustrating a system for scan ahead and analysis of NVMe command submission queues in accordance with some embodiments of the present disclosure.

FIG. 2 is a block diagram illustrating a system for scan ahead and analysis of NVMe command submission queues in accordance with some embodiments of the present disclosure. As illustrated, host system 120 any number of applications and/or virtual machines 150 which can be executed by a number of processing cores 260. Host system 120 further includes host memory 122, including a number of queues, such as submission queues 124 and completion queues 126. For example, the queues in host memory 122 may be arrange into a number of queue pairs, each including one submission queue (e.g., 124-1, 124-2, 124-*n*) and a corresponding completion queue (e.g., 126-1, 126-2, 126-*n*). Although only a certain number of queue pairs are illustrated, it should be understood that host memory 122 can include any number of queue pairs.

The applications and/or virtual machines 150 may be configured to perform any possible type of operations, such as operations that utilize memory sub-system 110. For example, the applications and/or virtual machines 150 can issue requests to read data which may be stored on memory device 130 of memory sub-system 110, or write data to the memory device 130. In one embodiment, these memory access requests are sent by the parallel processing threads 262 being executed by processing cores 260. Processing cores 260 can include a number of general-purpose processing devices such as microprocessors, central processing units (CPUs), or the like, or more specialized processing devices, such as graphics processing units (GPUs), which may be optimized for performing high-speed sequential processing operations. Depending on the implementation there can be any number of processing cores 260 (e.g., tens or hundreds), each executing a respective one of processing threads 262. Each processing thread 262 represents a series of sequential operations directed to memory sub-system 110. Upon the requests from each processing thread 262 being generated, the requests can be stored as entries in one of submission queues 124-1, 124-2, 124-*n*, from which they can be issued to memory sub-system 110. Received responses to the requests from memory sub-system 110 can be stored as entries in one of completion queues 126-1, 126-2, 126-*n*, and then retrieved by processing threads 262 and provided to applications and/or virtual machines 150.

In some embodiments, the submission queues 124 and completion queues 126 can be implemented as circular buffers, where new entries are inserted at certain location specified by a pointer. For example, a tail pointer indicates the position where new data is written, and is incremented with each new insertion, wrapping around to the beginning of the buffer once the end is reached. A head pointer is also used to track the location of the next data item to be processed, and advances as entries are retrieved and processed, similarly wrapping around when the end of the buffer is reached. The circular structure of the submission queues 124 and completion queues 126 allows them to efficiently reuse space while preventing overwriting of data, with the buffers being considered full when the next position of the tail pointer would coincide with the head pointer. While there can be any number of queue pairs dedicated for use with host-initiated memory access requests, host memory 122 can further include one or more queue pairs dedicated for administrative commands.

In some embodiments, memory sub-system 110 uses a defined arbitration scheme to select submission queue entries from the various submission queues 124-1, 124-2, **124-*n*. For example, when new entries are added to a submission queue, the host system 120 may write to a corresponding doorbell register in the memory sub-system to indicate the addition of the new entries. Processing logic (e.g., an NVMe controller) in the memory sub-system can monitor these doorbell registers to detect new entries and fetch the entries via PCIe direct memory access (DMA). If multiple submission queues have pending entries for processing, the processing logic can utilize an arbitration scheme, such as round-robin, weighted round-robin, or priority-based selection. Conventionally, this would result in the processing logic retrieving one entry from submission queue 124-1, then one entry from submission queue 124-2**, and so on, which may be referred to as the natural order. Given that processing the commands from the submission queue entries can take varying amounts of time, new entries may continue to build up in the submission queues until they are retrieved by the memory sub-system in the natural order. The contents of those additional entries in the submission queues, however, are unknown to the memory sub-system until the entries are later retrieved for processing.

As will be described in more detail below, scan ahead module 113 can perform scan ahead operations and analysis of the submission queues 124 on the host system 120. In one embodiment, scan ahead module 113 can periodically perform a scan of the host system submission queues 124 and populate scan ahead buffer 160 with indications of the pending submission queue entries representing the issued NVMe commands. Without actually processing the commands, scan ahead module 113 can utilize a direct memory access (DMA) techniques to read the contents of the submission queues 124 and then analyze the pending submission queue entries in order to optimize operations in the memory sub-system 110. For example, scan ahead module 113 can determine command metrics based on the pending entries and forecast the memory access workloads in order to process the commands more efficiently in the future. Subsequently, as the commands are retrieved from the submission queues 124 in their natural order (e.g., according to a defined arbitration scheme) the processing of the commands can be optimized based on the analysis of the scan ahead buffer 160. Further details with regard to the operations of scan ahead module 113 are described below.

Figure 3:
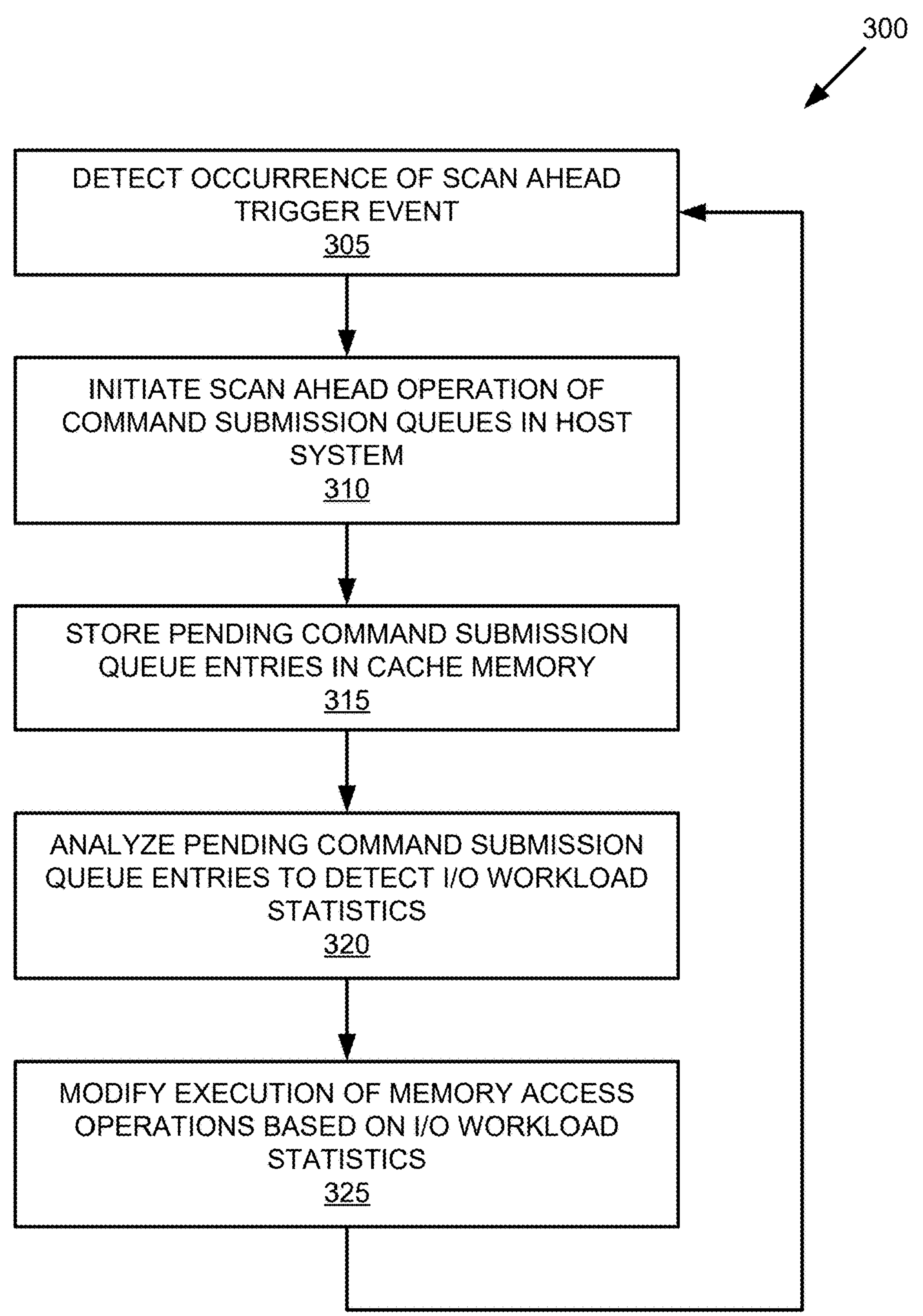
FIG. 3 is a flow diagram of an example method of scan ahead and analysis of NVMe command submission queues on a host system in accordance with some embodiments of the present disclosure.

FIG. 3 is a flow diagram of an example method of scan ahead and analysis of NVMe command submission queues on a host system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the scan ahead module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., scan ahead module 113) detects an occurrence of a scan ahead trigger event in a memory sub-system 110. A scan ahead trigger can be implemented in any number of different ways. For example, the scan ahead trigger may be time-based, such that a scan ahead trigger event is detected when a threshold amount of time has passed since a previous scan of the host system submission queues 124. In another embodiment, the scan ahead trigger may be command-based, such that a scan ahead trigger event is detected when a threshold number of submission queue entries have been added to the host system submission queues 124. As noted above, the memory sub-system 110 may be notified via the doorbell register each time a new submission queue entry is added and, thus, is able to track the number of entries added to the submission queues 124 over time.

Figure 4:
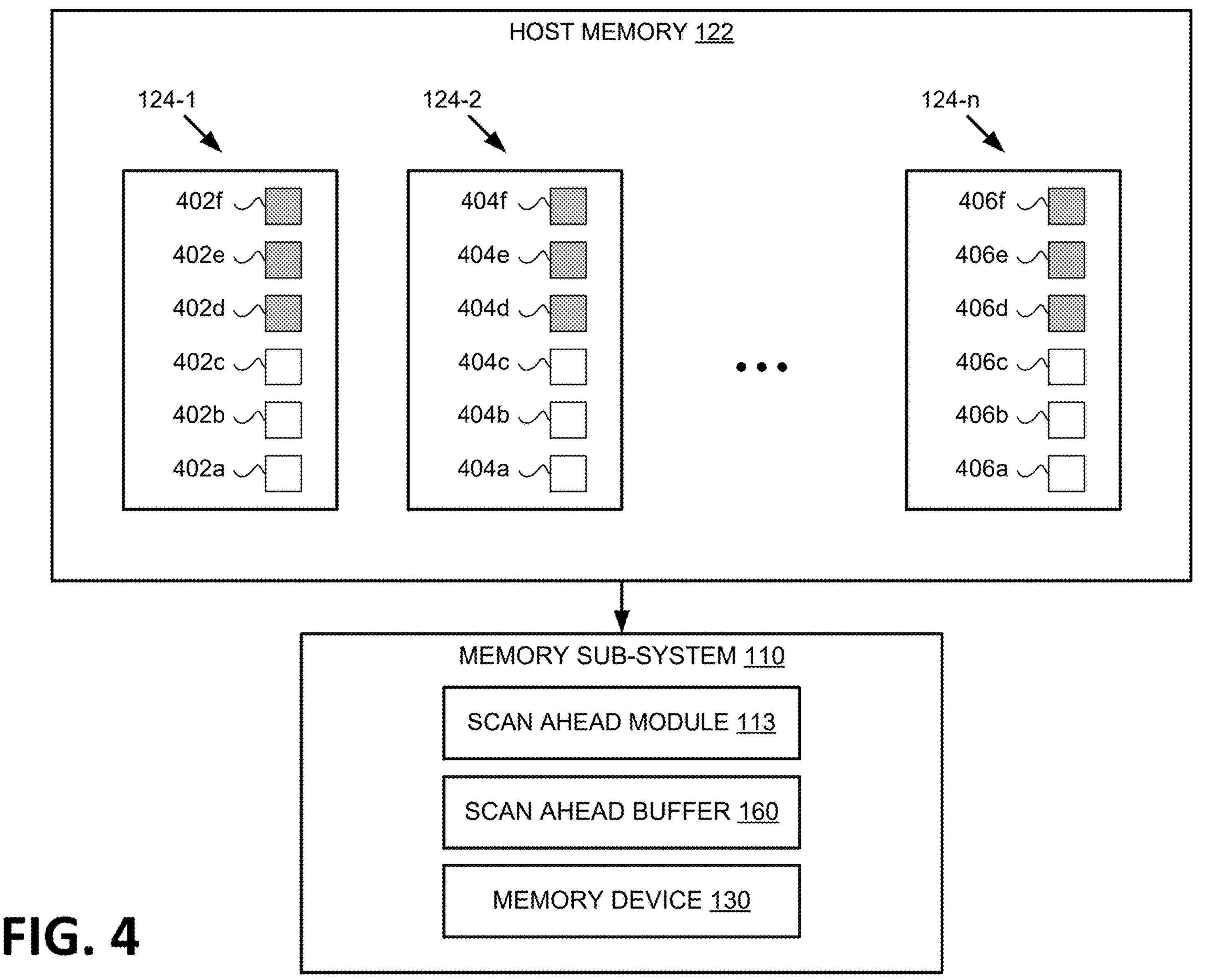
FIG. 4 is a diagram illustrating command submission queues in a host system in accordance with some embodiments of the present disclosure.

At operation 310, the processing logic initiates a scan ahead operation of a plurality of command submission queues 124 in a host system 120 to read a plurality of pending command submission queue entries from the plurality of command submission queues 124. FIG. 4 is a diagram illustrating command submission queues in a host system in accordance with some embodiments of the present disclosure. As illustrated, host memory 122 includes command submission queues 124-1, 124-2, **124-*n*, each including a number of command submission queue entries. The corresponding completion queues are not illustrated in FIG. 4 for the sake of simplicity. For example, command submission queue 124-1 includes command submission queue entries 402*a-f*, command submission queue 124-2 includes command submission queue entries 404*a-f*, and command submission queue 124-*n* includes command submission queue entries 406*a-f*. It should be understood that the number of command submission queues 124 shown in host memory 122, as well as the number of command submission queue entries in each queue, are merely exemplary, and can vary in other embodiments. As described above, applications and/or virtual machines 150 executing on host system 120 may add command submission queue entries to respective command submission queues, where the command submission queue entries represent memory access commands issued by the host system 120 and directed to memory device 130 of the memory sub-system 110**. For example, each command submission queue entry may represent a corresponding memory access command, such as a read command or a program command.

In one embodiment, processing logic in the memory sub-system implements a defined arbitration scheme to retrieve command submission queue entries from the command submission queues 124 in a natural order. For example, the arbitration scheme could include round-robin, weighted round-robin, priority-based selection, or some other arbitration scheme. Once the command submission queue entries are retrieved, the memory sub-system can execute memory access operations corresponding to the commands. For example, the processing logic can read data from the memory device 130 or write data to the memory device 130. This execution can take some amount of time (i.e., latency) and the command submission queue entries may remain in the command submission queues 124 while the corresponding operations are being executed. At the same time, additional command submission queue entries may continue to be added to the command submission queues 124. Thus, each of the command submission queues 124 may include some number of command submission queue entries having corresponding commands that are being executed, and some number of pending command submission queue entries that are still waiting to be retrieved. As illustrated in FIG. 4, command submission queue 124-1 includes command submission queue entries 402*a-c*, which have already been retrieved, and command submission queue entries 402*d-f*, which are waiting to be retrieved. Similarly, command submission queue 124-2 includes command submission queue entries 404*a-c*, which have already been retrieved, and command submission queue entries 404*d-f*, which are waiting to be retrieved, and command submission queue **124-*n* includes command submission queue entries 406***a-c*, which have already been retrieved, and command submission queue entries 406*d-f*, which are waiting to be retrieved.

During the scan ahead operation, scan ahead module 113 can use DMA to read a plurality of pending command submission queue entries from the plurality of command submission queues 124. For example, even though command submission queue entries 402*d-f*, 404*d-f*, and 406*d-f*, have not yet been retrieved from the command submission queues 124, scan ahead module 113 can "scan ahead" in the command submission queues 124 to read those pending command submission queue entries. The scan ahead module 113 can utilize DMA to efficiently read the pending command submission queue entries without CPU intervention. Thus, the scan ahead operation reads the plurality of pending command submission queue entries before the plurality of pending command submission queue entries are retrieved according to the natural order defined by the submission queue arbitration scheme.

In addition, while some number of command submission queues, such as command submission queues 124-1, 124-2, may be dedicated for use with host-initiated memory access commands, host memory 122 may further include one or more administrative command submission queues, such as **124-*n*, including a number of command submission queue entries representing administrative commands, such as command submission queue entries 406***a-f*. The administrative commands can include non-input/output (I/O) commands, such as smart commands, log commands, etc., that are periodically issued to the memory sub-system 110. The processing of such administrative commands typically include manipulation of memory statistics or log information returning results to the host system 120. These administrative commands may be issued to the memory sub-system 110 at regular periodic intervals. By scanning ahead to read the administrative submission queue **124-*n*, scan ahead module 113 can identify the presence of the pending administrative commands in advance, and preemptively retrieve data or perform other associated processing operations in order to accelerate the command processing and reduce overall latency. This may improve the quality of service afforded to the host system 120** and also reduce the amount of time spent on processing administrative commands, which allows more time to be spent processing host-initiated I/O commands.

Referring again to FIG. 3, at operation 315, the processing logic stores respective indications (e.g., copies) of the plurality of pending command submission queue entries in a cache memory, such as scan ahead buffer 160, of the memory sub-system 110. Scan ahead buffer 160 can be a dedicated memory (e.g., a volatile memory device, such as static random access memory (SRAM)) or a portion of some other larger memory device. Using the example from FIG. 4, after performing the scan ahead operation, scan ahead module 113 can store indications of command submission queue entries 402*d-f*, 404*d-f*, and 406*d-f* in scan ahead buffer 160.

At operation 320, the processing logic analyzes the respective indications of the plurality of pending command submission queue entries in the cache memory (i.e., scan ahead buffer 160) to detect input/output (I/O) workload statistics associated with the plurality of command submission queues 124. For example, scan ahead module 113 can determine command type statistics (i.e., whether the command submission queue entries correspond to read or write commands, a ratio of different command types, etc.), traffic patterns (i.e., whether the command are directed to sequential memory addresses or random memory addresses), transfer length statistics (i.e., the size of the requested data to be read or written), optimizations for scatter/gather lists (SGL) or physical page regions (PRP) (i.e., sequential coalescing, avoid multiple fetching), or other I/O workload statistics. Scan ahead module 113 can determine such I/O workload statistics in the aggregate (i.e., across all command submission queues 124) or separately for individual command submission queues 124.

At operation 325, the processing logic modifies execution of one or more memory access operations associated with the plurality of memory access commands based the I/O workload statistics. Using the I/O workload statistics, scan ahead module 113 can modify the execution of the memory access operations in order to provide improved quality of service to the host system 120, and achieve better performance and reliability and reduced read disturb effects in the memory sub-system 110. Although the memory access operations may not normally be performed until the corresponding command submission queue entries are subsequently retrieved from the command submission queues according to the defined arbitration scheme, depending on the I/O workload statistics, some memory access operations may be performed in advance. In some embodiments, modifying the execution of the memory access operations can include changing the order in which the memory access operations are performed. For example, scan ahead module 113 can identify a series of memory access commands directed to sequential memory addresses and execute them all in order, even if they were not received from the host system in the same order. In some embodiments, scan ahead module may coalesce multiple individual memory access commands together and send a single, or lesser number, of commands to the memory device 130. Depending on the I/O workload statistics, such as if the read workload is heavier than the write workload, the scan ahead module might prioritize the read operations. In some embodiments, data read from the memory device 130 can be stored temporarily in a cache memory so that is available when a subsequent read request for the data is received. The modifications to the execution of the memory access operations are based not on the current commands that have been received in the command submission queue entries retrieved from the command submission queues 124, but instead based on future commands pending in the command submission queues and yet to be received. The future commands are identified only as a result of the scan ahead operation performed by scan ahead module 113.

In some embodiments, the scan ahead module 113 can perform a read ahead operation on memory device 130. For example, in response to the I/O workload statistics indicating a sequential read workload, the scan ahead module can modify the execution of the one or more memory access operations by prefetching data from the memory device 130 prior to receiving a request for the data. If the data has a memory address that is sequential to data for which a request was previously received in the sequential read workload, rather than perform two separate read operations (which introduces additional overhead and latency), the scan ahead module 130 can read both piece of data from the memory device 130 at the same time. The scan ahead module 130 can return the requested data to the host system 120 and keep the other data in a cache memory until the subsequent request is received. At that time, the data can be returned directly from the cache memory, without requiring an additional access of the memory device 130. This reduces latency and read disturb effects in the memory device 130.

In some embodiments, scan ahead module 113 can handle command timeouts that may occur during execution of the memory access operations. For example, the host system 120 issuing commands might set a command timeout threshold defining a period of time after a corresponding command submission queue entry is placed in a command submission queue 124 during which execution of the command is to be completed. If the command timeout threshold is exceeded, the host system 120 may cancel and reissue the command. The processing time of commands can vary, for example, based on the number of other entries in the command submission queue 124, the type of command, whether the command (or another prior command) triggers error recovery operations, etc. Thus, in some embodiments, the scan ahead module 113 can use the entries in the scan ahead buffer 160 and the calculated I/O statistics to determine how long it is likely to take a first pending command to be processed (i.e., a projected latency). If that projected latency exceeds the command timeout threshold, scan ahead module may suspend execution of a second command (e.g., a command that is currently executing and is slowing down the command execution pipeline) and prioritize execution of the first pending command. This may prevent the first command from timing out and improve the quality of service provided to the host system 120.

Figure 5:
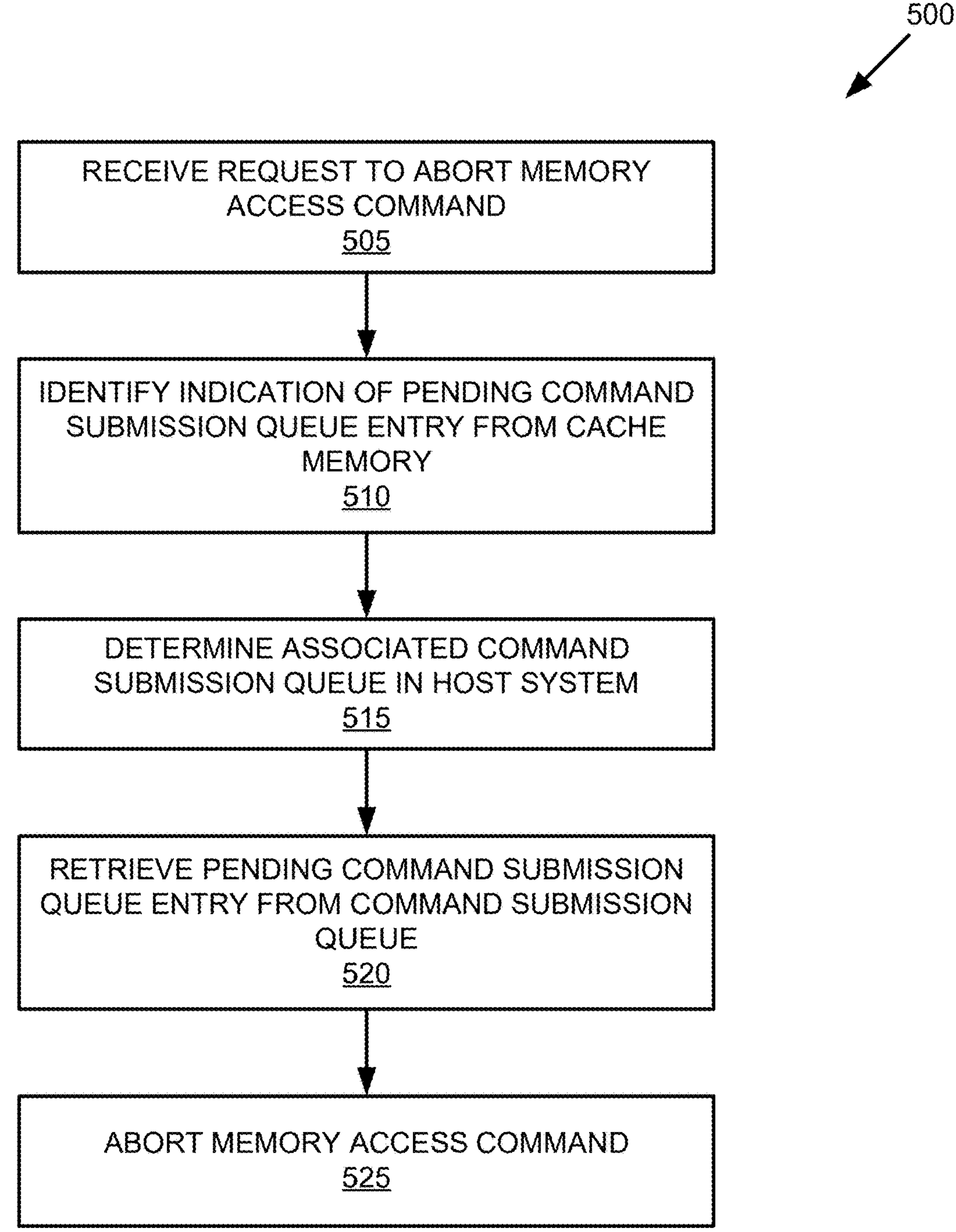
FIG. 5 is a flow diagram of an example method of scan ahead and analysis of NVMe command submission queues on a host system for command abort in accordance with some embodiments of the present disclosure.

FIG. 5 is a flow diagram of an example method of scan ahead and analysis of NVMe command submission queues on a host system for command abort in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the scan ahead module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic (e.g., scan ahead module 113) receives, from a host system, such as host system 120, a request to abort a memory access command issued by the host system 120 and directed to a memory device in the memory sub-system 110, such as memory device 130. For example, host system 120 may have previously issued one or more memory access commands to read data from memory device 130. For any number of possible reasons, the host system 120 may decide to abort one or more of those memory access commands, such as if a prior command failed (e.g., suffered an error) and the entire sequence was reissued, such that the remaining pending read commands are no longer necessary. In such a scenario, the host system may issue a request to the memory sub-system 110, and this request can be received by the scan ahead module 113.

At operation 510, the processing logic identifies, from a cache memory in the memory sub-system 110, such as scan ahead buffer 160, an indication of a pending command submission queue entry representing the memory access command. In one embodiment, scan ahead module 113 may identify the indication of the corresponding pending command submission queue entry in scan ahead buffer 160. As described above, scan ahead module 113 may have previously read the contents of command submission queues 124 in host memory 122 during a scan ahead operation and stored indications of the pending command submission queue entries in the scan ahead buffer 160.

At operation 515, the processing logic determines a command submission queue of a plurality of command submission queues in the host system 120 with which the indication of the pending command submission queue entry is associated. As described above, the entries in scan ahead buffer 160 may include indications of the respective command submission queues 124 in host memory 122 from which the pending command submission queue entries were read. For example, if the host system 120 requested to abort a memory access command represented by pending command submission queue entry **404*f*, the scan ahead module 113 can determine from the information in the corresponding entry in scan ahead buffer 160, that the pending command submission queue entry 404*f* was read from command submission queue 124-2 of host memory 122**.

At operation 520, the processing logic retrieves the pending command submission queue entry from the command submission queue. In one embodiment, scan ahead module 113 can issue a fetch command to the host memory 122 to retrieve the pending command submission queue entry **404*f* from command submission queue 124-2. In some embodiments, there may be one or more preceding pending command submission queue entries in the command submission queue 124-2. For example, while pending command submission queue entries 404*a*, 404*b*, and 404*c* may have already been retrieved, although pending command submission queue entries 404*d* and 404*e* have been read during the scan ahead operation, the pending command submission queue entries 404*d* and 404*e* have not yet been retrieved from command submission queue 124-2. Accordingly, in order to retrieve the pending command submission queue entry 404*f* from command submission queue 124-2, scan ahead module 113 may first retrieve the pending command submission queue entries 404*d* and 404*e*. It can be noted that in some embodiments, retrieving the pending command submission queue entry 404*f* and the one or more preceding pending command submission queue entries 404*d* and 404*e* from the command submission queue 124-2 contravenes the natural order defined by the submission queue arbitration scheme. During normal operation, the scan ahead module 113 would have retrieved one pending command submission queue entry from each of the command submission queues (e.g., in a round-robin fashion). In the case of an aborted memory access command, however, the scan ahead module 113** may forgo the natural order defined by the submission queue arbitration scheme and retrieve the corresponding pending command submission queue entry directly (i.e., out-of-order).

At operation 525, the processing logic aborts the memory access command represented by the retrieved pending command submission queue entry. Once retrieved from the command submission queue 124-2, scan ahead module can delete the pending command submission queue entry 404*f* and prevent execution of the corresponding memory access command on the memory device 130.

Figure 6:
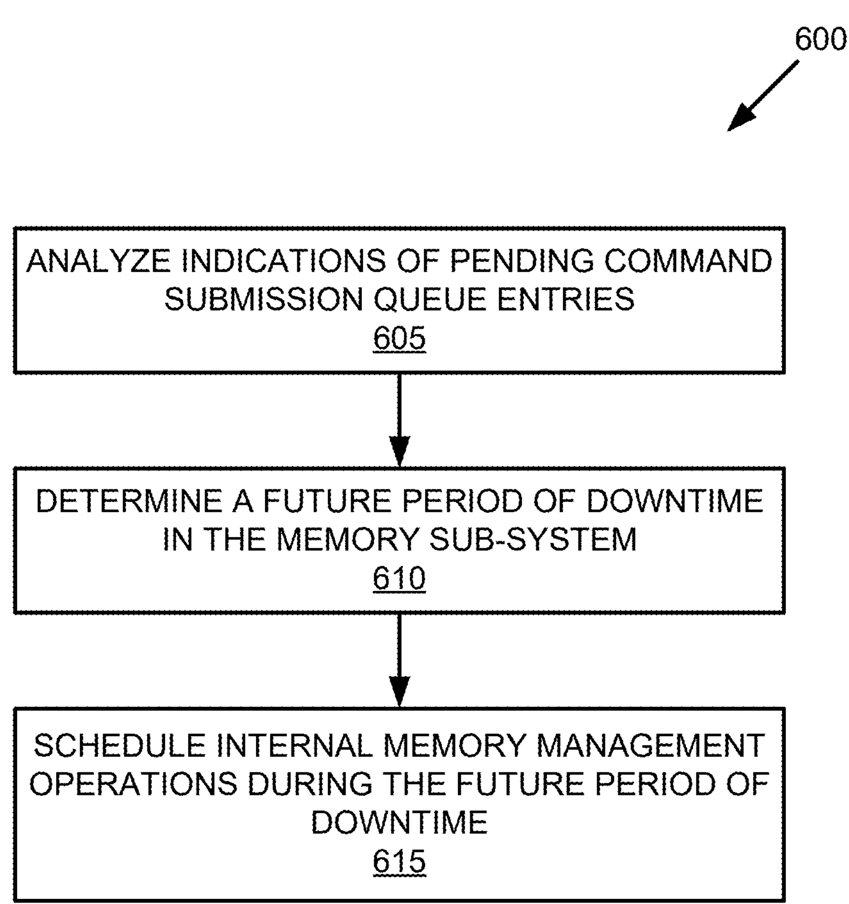
FIG. 6 is a flow diagram of an example method of scan ahead and analysis of NVMe command submission queues on a host system for command prioritization in accordance with some embodiments of the present disclosure.

FIG. 6 is a flow diagram of an example method of scan ahead and analysis of NVMe command submission queues on a host system for command prioritization in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the scan ahead module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing logic (e.g., scan ahead module 113) analyzes respective indications of a plurality of pending command submission queue entries in a cache memory, such as scan ahead buffer 160, to determine expected initialization and completion times for the plurality of pending command submission queue entries. As described above, scan ahead module 113 may have previously read the contents of command submission queues 124 in host memory 122 during a scan ahead operation and stored indications of the pending command submission queue entries in the scan ahead buffer 160, where the pending command submission queue entries represent memory access commands issued by the host system 120 and directed to a memory device, such as memory device 130, in the memory sub-system 110. In one embodiment, the expected initialization and completion times for the pending command submission queue entries are based on a type of the plurality of memory access commands (e.g., read commands, program commands, erase commands), a number of the plurality of pending command submission queue entries in the plurality of command submission queues 124, and an expected execution time of memory access operations associated with the plurality of memory access commands. For example, scan ahead module 113 may consider how long the execution of a given type of command is expected to last and how many of those commands are present in a given command submission queue. Based on this information scan ahead module 113 can determine when a given command will be initialized (i.e., begin execution) and complete (i.e., finish execution). Scan ahead module 113 can further determine how long it will take all, or a subset, of the pending command submission queue entries will take to complete.

At operation 610, the processing logic determines, based on the expected initialization and completion times, a future period of downtime in the memory sub-system 110. In one embodiment, the future period of downtime comprises a period when the processing device, such as memory sub-system controller 115 executing scan ahead module 113, is not executing the memory access operations associated with the plurality of memory access commands. For example, upon determining when execution of the pending command submission queue entries will be completed, the scan ahead module 113 can determine that there will be a future period of downtime. In other embodiments, the future period of downtime may include a period when there are fewer memory access commands being executed or when lower priority memory access commands are being executed.

At operation 615, the processing logic schedules one or more internal memory management operations on a memory device of the memory sub-system 110, such as memory device 130, during the future period of downtime. For example, the internal memory management operations may comprise a garbage collection operation, or other type of operation. Scheduling the internal memory management operations during the period of downtime prevents conflicts with the host-initiated memory access operations and improves the quality of service provided to the host system 120.

Figure 7:
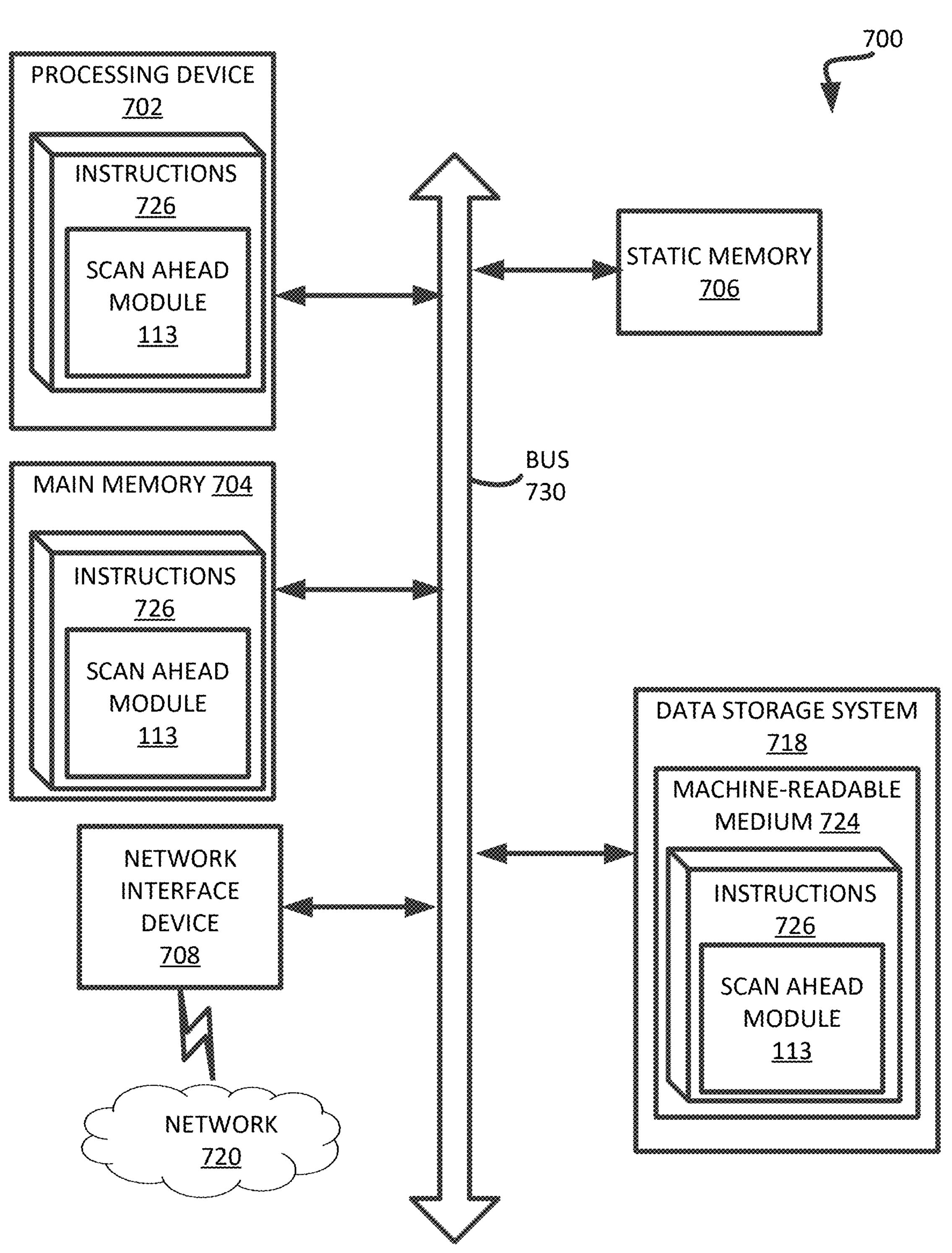
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the scan ahead module 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the scan ahead module 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device;

a cache memory; and a processing device, operatively coupled with the memory device and the cache memory, to perform operations comprising:

analyzing respective indications of a plurality of pending command submission queue entries in the cache memory to determine expected initialization and completion times for the plurality of pending command submission queue entries;

determining, based on the expected initialization and completion times, a future period of downtime in the system; and scheduling one or more internal memory management operations on the memory device during the future period of downtime.

2. The system of claim 1, wherein the processing device is to perform operations further comprising:

detecting an occurrence of a scan ahead trigger event;

initiating a scan ahead operation of a plurality of command submission queues in a host system to read the plurality of pending command submission queue entries from the plurality of command submission queues; and storing the respective indications of the plurality of pending command submission queue entries in the cache memory.

3. The system of claim 2, wherein the scan ahead operation reads the plurality of pending command submission queue entries before the plurality of pending command submission queue entries are retrieved according to a natural order defined by a submission queue arbitration scheme.

4. The system of claim 2, wherein the plurality of pending command submission queue entries represent a plurality of memory access commands issued by the host system and directed to the memory device.

5. The system of claim 4, wherein the expected initialization and completion times for the plurality of pending command submission queue entries are based on a type of the plurality of memory access commands, a number of the plurality of pending command submission queue entries in the plurality of command submission queues, and an expected execution time of memory access operations associated with the plurality of memory access commands.

6. The system of claim 5, wherein the future period of downtime comprises a period when the processing device is not executing the memory access operations associated with the plurality of memory access commands.

7. The system of claim 1, wherein the one or more internal memory management operations comprise a garbage collection operation.

8. A method comprising:

analyzing respective indications of a plurality of pending command submission queue entries in a cache memory of a memory sub-system to determine expected initialization and completion times for the plurality of pending command submission queue entries;

determining, based on the expected initialization and completion times, a future period of downtime in the memory sub-system; and scheduling, by a processing device, one or more internal memory management operations on a memory device of the memory sub-system during the future period of downtime.

9. The method of claim 8, further comprising:

detecting an occurrence of a scan ahead trigger event;

initiating a scan ahead operation of a plurality of command submission queues in a host system to read the plurality of pending command submission queue entries from the plurality of command submission queues; and storing the respective indications of the plurality of pending command submission queue entries in the cache memory.

10. The method of claim 9, wherein the scan ahead operation reads the plurality of pending command submission queue entries before the plurality of pending command submission queue entries are retrieved according to a natural order defined by a submission queue arbitration scheme.

11. The method of claim 9, wherein the plurality of pending command submission queue entries represent a plurality of memory access commands issued by the host system and directed to the memory device.

12. The method of claim 11, wherein the expected initialization and completion times for the plurality of pending command submission queue entries are based on a type of the plurality of memory access commands, a number of the plurality of pending command submission queue entries in the plurality of command submission queues, and an expected execution time of memory access operations associated with the plurality of memory access commands.

13. The method of claim 12, wherein the future period of downtime comprises a period when the processing device is not executing the memory access operations associated with the plurality of memory access commands.

14. The method of claim 8, wherein the one or more internal memory management operations comprise a garbage collection operation.

15. A non-transitory computer-readable storage medium comprising instructions that, when executed by a processing device, cause the processing device to perform operations comprising:

analyzing respective indications of a plurality of pending command submission queue entries in a cache memory of a memory sub-system to determine expected initialization and completion times for the plurality of pending command submission queue entries;

determining, based on the expected initialization and completion times, a future period of downtime in the memory sub-system; and scheduling one or more internal memory management operations on a memory device of the memory sub-system during the future period of downtime.

16. The non-transitory computer-readable storage medium of claim 15, wherein the instructions cause the processing device to perform operations further comprising:

detecting an occurrence of a scan ahead trigger event;

initiating a scan ahead operation of a plurality of command submission queues in a host system to read the plurality of pending command submission queue entries from the plurality of command submission queues; and storing the respective indications of the plurality of pending command submission queue entries in the cache memory.

17. The non-transitory computer-readable storage medium of claim 16, wherein the scan ahead operation reads the plurality of pending command submission queue entries before the plurality of pending command submission queue entries are retrieved according to a natural order defined by a submission queue arbitration scheme.

18. The non-transitory computer-readable storage medium of claim 16, wherein the plurality of pending command submission queue entries represent a plurality of memory access commands issued by the host system and directed to the memory device.

19. The non-transitory computer-readable storage medium of claim 18, wherein the expected initialization and completion times for the plurality of pending command submission queue entries are based on a type of the plurality of memory access commands, a number of the plurality of pending command submission queue entries in the plurality of command submission queues, and an expected execution time of memory access operations associated with the plurality of memory access commands.

20. The non-transitory computer-readable storage medium of claim 19, wherein the future period of downtime comprises a period when the processing device is not executing the memory access operations associated with the plurality of memory access commands, and wherein the one or more internal memory management operations comprise a garbage collection operation.

* * * * *